(12) United States Patent
Wei et al.

(10) Patent No.: US 6,714,526 B2
(45) Date of Patent: Mar. 30, 2004

(54) METHOD AND APPARATUS FOR CODE ASSIGNMENT IN A SPREAD SPECTRUM WIRELESS COMMUNICATION SYSTEM

(75) Inventors: Yongbin Wei, San Diego, CA (US); Peter J. Black, San Diego, CA (US); Edward G. Tiedemann, Jr., San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 442 days.

(21) Appl. No.: 09/737,893

(22) Filed: Dec. 15, 2000

(65) Prior Publication Data

US 2002/0110102 A1 Aug. 15, 2002

(51) Int. Cl.[7] .............................................. H04B 7/216
(52) U.S. Cl. ..................... 370/335; 370/342; 370/347
(58) Field of Search ............................ 370/342, 343, 370/344, 345, 335, 319, 320; 375/130, 133, 140, 141, 149; 455/456.1

(56) References Cited

U.S. PATENT DOCUMENTS 5,590,160 A  * 12/1996 Ostman ..................... 375/367
6,324,227 B1 * 11/2001 Kang et al. ................ 375/343

OTHER PUBLICATIONS

Li Daoben, et al., "LAS–CDMA" LinkAir Communications Inc., Organizational Partners. Pp. 1–63.
Li Daoben, et al., "Physical Layer Specification for LAS–2000" CWTS China Wireless Telecommunication Standards; LinkAir Communications, Inc., Organizational Partners. Pp. 1–45.
Jacob H. Gunther, et al., "A New Approach for Symbol Frame Synchronization and Carrier Frequency Estimation in OFDM Communications," Dept. Of Elct. & Comp. Engineering, Brigham Young Univ., Provo, UT 84602.

* cited by examiner

*Primary Examiner*—Wellington Chin
*Assistant Examiner*—Raj Jain
(74) *Attorney, Agent, or Firm*—Philip Wadswoth; Kent Baker; Sandra L. Godsey (57) ABSTRACT

Method and apparatus for code assignments in a spread-spectrum wireless communication system incorporating a Large Area Synchronized-Code Division Multiple Access (LAS-CDMA) protocol. The method determines a set of LS codes based on an interference free window size. An arborescence structure provides the correspondence between the interference free window size and the set of LS codes. Subsets of the LS codes are formed having null cross-correlation within the interference free window. The subsets are assigned to neighboring cells in the system to reduce interference between neighbors. In one embodiment, a controller determines the subsets and makes the assignments to cells within the system.

22 Claims, 8 Drawing Sheets

| PERMUTATION LABEL | \multicolumn{16}{c}{LA CODE INDICES} |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| σ1 | 1 | 2 | 3 | 4 | 5 | 6 | 7 | 8 | 9 | 10 | 11 | 12 | 13 | 14 | 15 | 16 |
| σ2 | 2 | 4 | 6 | 8 | 10 | 12 | 14 | 16 | 1 | 3 | 5 | 7 | 9 | 11 | 13 | 15 |
| σ3 | 3 | 6 | 9 | 12 | 15 | 1 | 4 | 7 | 10 | 13 | 16 | 2 | 5 | 8 | 11 | 14 |
| σ4 | 4 | 8 | 12 | 16 | 3 | 7 | 11 | 15 | 2 | 6 | 10 | 14 | 1 | 5 | 9 | 13 |
| σ5 | 5 | 10 | 15 | 3 | 8 | 13 | 1 | 6 | 11 | 16 | 4 | 9 | 14 | 2 | 7 | 12 |
| σ6 | 6 | 12 | 1 | 7 | 13 | 2 | 8 | 14 | 3 | 9 | 15 | 4 | 10 | 16 | 5 | 11 |
| σ7 | 7 | 14 | 4 | 11 | 1 | 8 | 15 | 5 | 12 | 2 | 9 | 16 | 6 | 13 | 3 | 10 |
| σ8 | 8 | 16 | 7 | 15 | 6 | 14 | 5 | 13 | 4 | 12 | 3 | 11 | 2 | 10 | 1 | 9 |
| σ9 | 9 | 1 | 10 | 2 | 11 | 3 | 12 | 4 | 13 | 5 | 14 | 6 | 15 | 7 | 16 | 8 |
| σ10 | 10 | 3 | 13 | 6 | 16 | 9 | 2 | 12 | 5 | 15 | 8 | 1 | 11 | 4 | 14 | 7 |
| σ11 | 11 | 5 | 16 | 10 | 4 | 15 | 9 | 3 | 14 | 8 | 2 | 13 | 7 | 1 | 12 | 6 |
| σ12 | 12 | 7 | 2 | 14 | 9 | 4 | 16 | 11 | 6 | 1 | 13 | 8 | 3 | 15 | 10 | 5 |
| σ13 | 13 | 9 | 5 | 1 | 14 | 10 | 6 | 2 | 15 | 11 | 7 | 3 | 16 | 12 | 8 | 4 |
| σ14 | 14 | 11 | 8 | 5 | 2 | 16 | 13 | 10 | 7 | 4 | 1 | 15 | 12 | 9 | 6 | 3 |
| σ15 | 15 | 13 | 11 | 9 | 7 | 5 | 3 | 1 | 16 | 14 | 12 | 10 | 8 | 6 | 4 | 2 |
| σ16 | 16 | 15 | 14 | 13 | 12 | 11 | 10 | 9 | 8 | 7 | 6 | 5 | 4 | 3 | 2 | 1 |

METHOD AND APPARATUS FOR CODE ASSIGNMENT IN A SPREAD SPECTRUM WIRELESS COMMUNICATION SYSTEM

FIELD

The present invention relates to wireless data communication. More particularly, the present invention relates to a novel and improved method and apparatus for code assignment in a spread-spectrum wireless communication system.

BACKGROUND

In a spread spectrum wireless communication system, a base station communicates with multiple mobile users. In one system, a Code Division Multiple Access (CDMA) system, such as specified in the "TIA/EIA/IS-95 Mobile Station-Base Station Compatibility Standard for Dual-Mode Wideband Spread Spectrum Cellular System," hereinafter referred to as "the IS-95 standard," or the "TIA/EIA/IS-2000 Standards for cdma2000 Spread Spectrum Systems," hereinafter referred to as "the cdma2000 standard," codes are applied to the data and control information. The codes identify the target recipient as well as the sender. Operation of a CDMA system is described in U.S. Pat. No. 4,901,307, entitled "SPREAD SPECTRUM MULTIPLE ACCESS COMMUNICATION SYSTEM USING SATELLITE OR TERRESTRIAL REPEATERS," and also in U.S. Pat. No. 5,103,459, entitled "SYSTEM AND METHOD FOR GENERATING WAVEFORMS IN A CDMA CELLULAR TELEPHONE SYSTEM," both assigned to the assignee of the present application for patent and hereby expressly incorporated by reference. The forward link from base station to mobile users assigns a unique Walsh code to each mobile with which it transmits, wherein the Walsh code identifies the mobile. Similarly, the reverse link from the mobile user to the base station uses a Pseudorandom Noise (PN) code for channelization.

Alternate spread spectrum systems incorporate a variety of codes for the two-way identification. A problem exists as codes may be reused in neighboring cells and/or sectors, creating interference for adjacent neighbors. Therefore, a method is needed to provide the two-way identification of wireless communications while minimizing and/or reducing the interference experienced by neighboring cells and/or sectors. Similarly, there is a need for a code assignment method that achieves that reduces neighbor interference.

SUMMARY

The disclosed embodiments provide a novel and improved method for code assignment in a spread spectrum wireless communication system. In one aspect, in a wireless communication system adapted for Large Area Synchronized-Code Division Multiple Access (LAS-CDMA) transmissions having a plurality of LS codes, a method includes determining a size of an Interference Free Window (IFW), calculating a plurality of subsets from the plurality of LS codes, each subset comprising LS codes as a function of the IFW, assigning a first of the plurality of subsets to a first portion of the system, and assigning a second of the plurality of subsets to a second portion of the system.

In another aspect, a wireless communication system incorporating an LAS-CDMA protocol includes a first cell, the first cell being assigned a first subset of LS codes; and a second cell, the second cell being assigned a second subset of LS codes, wherein the first and second subsets have a null cross-correlation within a predetermined interference free window. Note that the LS codes within the first and second subsets also have a null cross-correlation with a predetermined IFW that is typically wider than that between cells.

In another aspect, in a Large Area Synchronized-Code Division Multiple Access wireless communication system, a method includes transmitting a first communication within a first cell, the first communication identifying at least one mobile station within the first cell by a first LS code within a first subset of LS codes; and transmitting a second communication within a second cell, the second communication identifying at least one mobile station within the second cell by a second LS code within a second subset of LS codes, wherein a cross-correlation of the first and second subsets is null within an interference free window.

In another aspect, a controller in a Large Area Synchronized-Code Division Multiple Access wireless communication system includes a first set of instructions for determining an interference free window size for communications between neighboring cells; and a second set of instructions for determining at least two sets of LS codes based on the interference free window size, a first set for identifying mobile stations in a first cell and a second set for identifying mobile stations in a neighboring cell, wherein the two sets of LS codes have a null cross-correlation within an interference free window. This is also true of the LS codes within each of the subsets with respect to each other.

According to still another aspect, in a Large Area Synchronized-Code Division Multiple Access wireless communication system, the system having a first cell and a first cell neighborhood, a computer data signal is embodied on a carrier wave, the signal including a first portion comprising information for transmission to a first mobile user in a first cell; and a second portion comprising a first LS code corresponding to the first mobile user, wherein the first LS code is part of a first set of LS codes exclusively assigned to the first cell within the first cell neighborhood.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein.

DETAILED DESCRIPTION OF THE PREFERRED EMBODIMENTS

In many spread-spectrum communication systems codes are applied to transmission signals for channelization. Often a first type of code is applied to the data signals to identify the designated mobile user, and a second type of code is applied that is specific to the base station. A CDMA system, for example, has a large number of codes available for spreading the data and control information transmitted in a wireless system, allowing one base station to communicate with multiple mobile users. The CDMA codes include a Walsh code assigned to each mobile user and a Pseudorandom Noise (PN) code specific to the base station. Both codes are applied to data signals transmitted by the base station. A set of Walsh codes is a set of orthogonal binary sequences, wherein the cross-correlation over time is zero. The Walsh codes are generated using a Hadamard matrix, wherein recursion allows expansion of a base code, or seed, into lengthier codes, thus increasing the size of the Walsh code set.

However, in contrast to Walsh codes, PN codes do not require synchronization such as used to implement Walsh codes. Rather, PN codes may be generated by linear feedback shift registers, wherein binary bits are shifted through the different stages of the register. Output bits from the last stage form the PN codes. PN codes have an auto-correlation characteristic that allows codes to align at the receiver. The combination of Walsh and PN codes allows identification of the base station and mobile station for wireless transmissions. Other systems may incorporate other codes and/or combinations of Walsh, PN, and other codes to identify the mobile user and the base station.

Large Area Synchronized-Code Division Multiple Access (LAS-CDMA) Systems

In another type of spread spectrum wireless communication system, referred to as a Large Area Synchronized-Code Division Multiple Access (LAS-CDMA) system, specially designed codes, referred to as "LS" and "LA" codes, are used to spread the signals for transmission. LAS-CDMA is a technique for spread-spectrum and time-division multiple access that creates channels through the use of time division and orthogonal codes. One LAS-CDMA system is described in the "Physical Layer Specification for LAS2000," a candidate proposal to the China Wireless Telecommunication Standard (CWTS).

In a LAS-CDMA system, communications are transmitted in frames, wherein a fixed number of sub-frames are included in each frame. Each sub-frame is then segmented into a predetermined number of time slots. The LS and LA codes are used for channelization, as in other CDMA systems, wherein the LS and LA codes are designed to have a small or zero cross-correlation over time.

A first type of code, the LS code, is applied to the data or symbols in each time slot. The LS code identifies the mobile user that is the target of the transmission. Within a given cell and/or sector, different LS codes are applied to each mobile user. In preparing each transmission, the appropriate LS code is modulated by a symbol, as described hereinbelow, to form a symbol modulated LS code.

A second type of code, the LA code, identifies the cell and/or sector, i.e., the base station operating within the area. Unlike the LS code that is applied to each time slot, the LA code is applied to the entire sub-frame, and defines the time allotted to each segment of the sub-frame. Application of a given LA code to the entire sub-frame results in various sized time gaps between modulated symbols. The combination and order of the gap sizes serves as an identification of the cell and/or sector.

Figure 1:
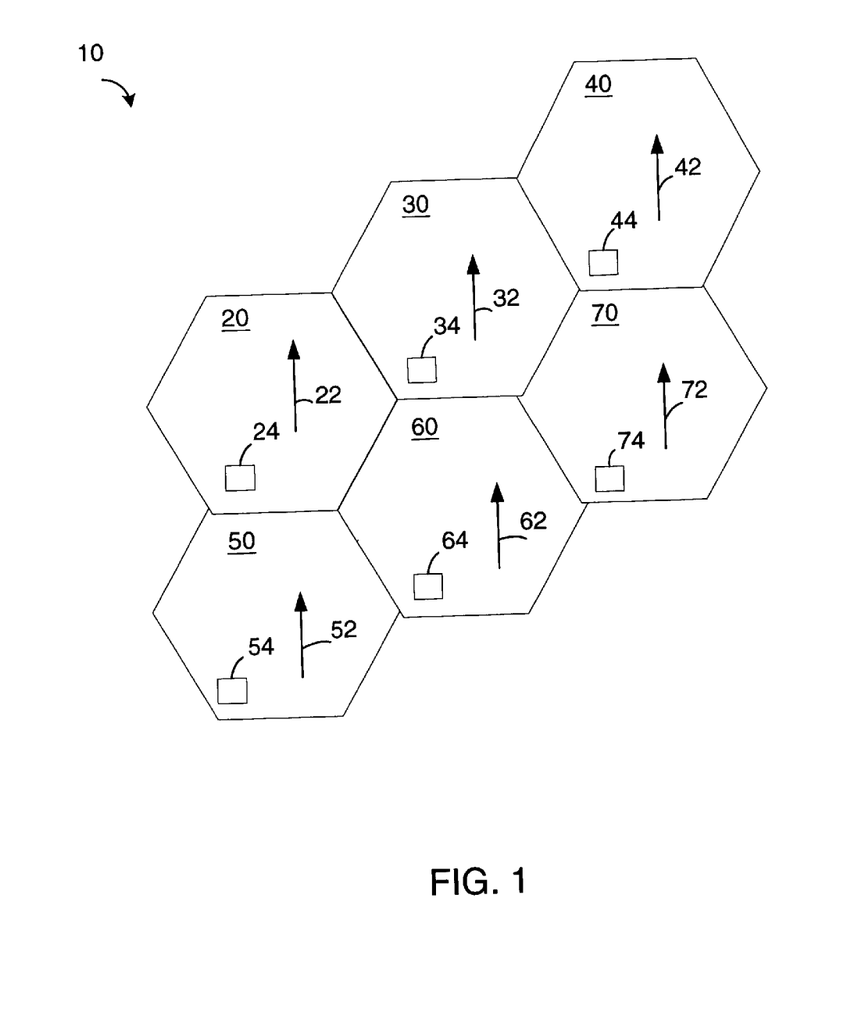
FIG. 1 illustrates in block diagram form a wireless communication system according to one embodiment.

An exemplary embodiment of a LAS-CDMA system is illustrated in FIG. 1. The system 10 is a LAS-CDMA system including a plurality of cells 20, 30, 40, 50, 60, 70, each having a base station 22, 32, 42, 52, 62, 72, respectively, for communication with mobile stations 24, 34, 44, 54, 64, 74, within the system 10. A forward channel is used for transmission of data from base stations 22, 32, 42, 52, 62, 72, to mobile stations 24, 34, 44, 54, 64, 74, within system 10. Each mobile station 24, 34, 44, 54, 64, 74, uses a reverse channel for transmission of data to at least one of base stations 22, 32, 42, 52, 62, 72. In other LAS-CDMA systems, the cells may be as configured in FIG. 1, or may be positioned in an alternate manner, wherein each base station is associated with at least one cell and/or sector.

As illustrated in FIG. 1, a first portion of the system 10 is referred to as cell 20. Other portions of the system 10 that are located in close proximity to cell 20 make up a neighborhood of cell 20. In system 10, the illustrated portion of the neighborhood of cell 20 includes cells 30, 50, and 60. Other portions within the neighborhood of cell 20 are not shown, but may be located anywhere in close proximity to cell 20. In one embodiment, a cell neighborhood includes those cells that border the cell geographically. In alternate embodiments, the neighboring criteria that determines which portions are included in a neighborhood may be made according to the interference experienced between cells, or some other criteria that relates to the interaction of wireless transmissions within cells.

Figure 2:
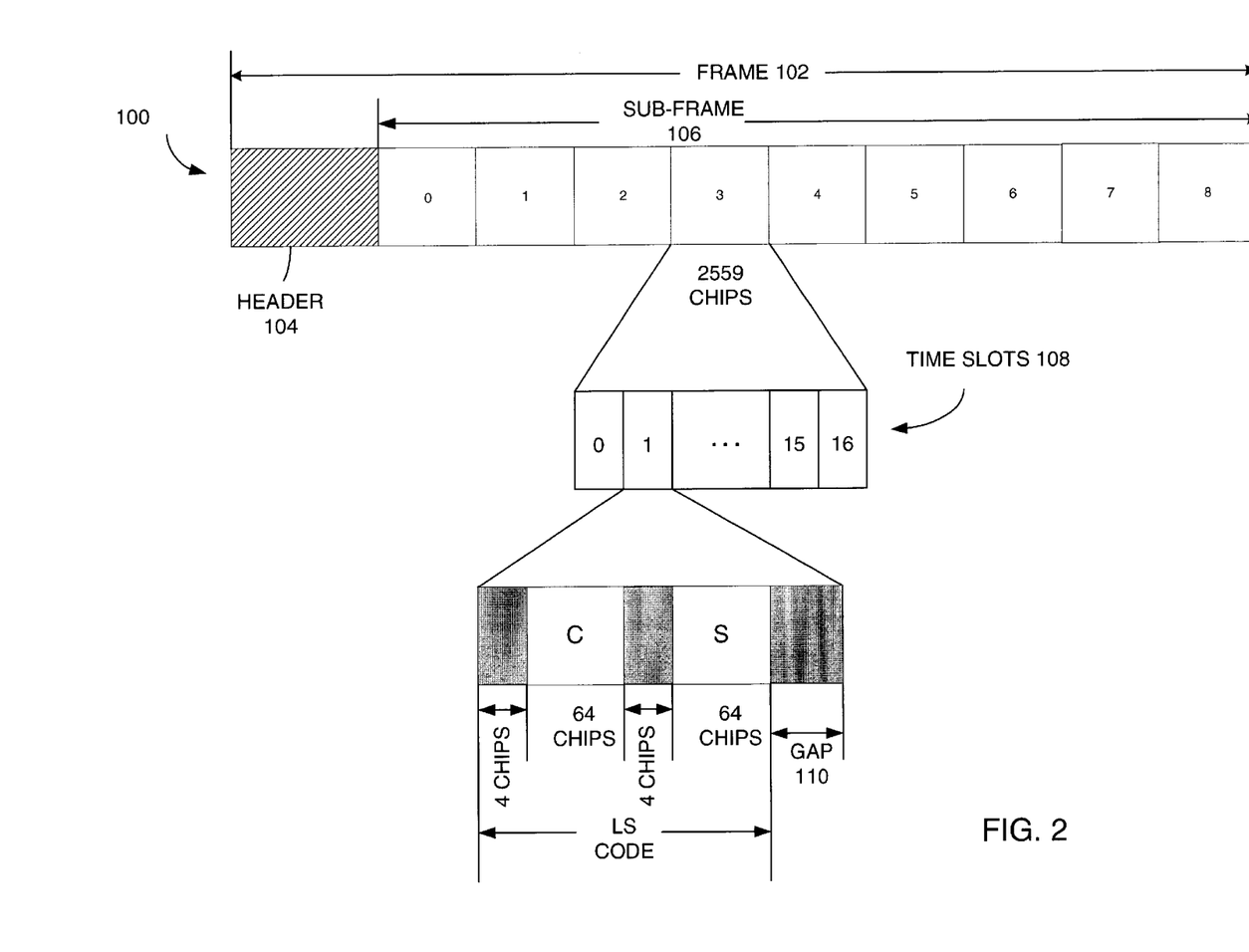
FIG. 2 illustrates in block diagram form a protocol for transmitting data in a wireless system according to one embodiment.

Within system 10, signals are prepared for transmission by formatting the signals into frames of a predetermined protocol. FIG. 2 illustrates one embodiment of a forward channel protocol 100 used in system 10 for transmitting data and control information in 20 ms frames, wherein each frame 102 includes a header field 104 and multiple sub-frames 106. The header field 104 designates pilot bursts and control information for the sync word and the sync sub-channel. The header field 104 is followed by a sequence of nine sub-frames 106, numbered 0, 1, 2, . . . 8. The sub-frames 106 are evenly spaced within the frame 102. Note that the header field 104 is made up of a first number of chips and each of the sub-frames 106 is made up of a second number of chips, wherein the second number is not necessarily equal to the first number. As used herein, a chip is defined as the sample in time.

As illustrated in FIG. 2, each sub-frame 106 includes a predetermined number of time slots 108, wherein each time slot 108 corresponds to an LS code modulated by a symbol. In the present embodiment, each sub-frame 106 includes 17 time slots, labeled 0, 1, 2, . . . 16. Each time slot 108 includes a modulated LS code and a subsequent gap 110 of variable size defined by the LA code. Note that the LS code is assigned to the mobile user, while the LA code is assigned to the base station. The modulated LS code is composed of a pair of complementary components, identified as "C" and "S" components as discussed in detail hereinbelow. Each C component is 64 chips and is preceded by a 4 chip gap. Each S component is 64 chips and is preceded by a 4 chip gap. Therefore, each modulated LS code consumes 136 chips: (4+64+4+64). The minimum size of any time slot 108 is, therefore, 136 chips.

In the present embodiment, the time slots 108 are not assigned a common chip length, but rather each time slot 108 within a sub-frame 106 is assigned a unique chip length. The chip length of each time slot 108 is determined by the gap 110 appended to the modulated LS code, wherein the sizes of the gaps 110 are not uniform over the entire sub-frame 106. The sizes of gaps 110 are determined by the assigned LA code. The LA code defines the size of each gap 110 within the time slot 108. The LA code is effectively a pattern that is applied to the entire sub-frame 106. LA codes are described in detail hereinbelow.

In one embodiment, the frame 102 is composed of 23,031 chips. The header field 104 is assigned 1545 chips, and each sub-frame 106 is assigned 2559 chips. As each sub-frame 106 contains 17 time slots 108, and each time slot 108 includes an LS code of 136 bits and a variable size gap 110, each time slot 108 is, therefore, at least 136 chips long, sufficient for the LS code. Note that if a time slot 108 is equal to 136 chips, there is no gap 110.

LA Codes

The gaps 110 are determined by the LA code of the cell and/or sector. Specifically, a LA code is a code used to determine the boundaries of time slots within a sub-frame and to identify a cell and/or sector. LA codes may be designated by the following parameters, (N, $K_0$, K):

(i) "N" is the number of pulses;

(ii) "$K_0$" is the minimum pulse interval; and (iii) "K" is the total LA code length in chips.

A pulse is a function with unit energy and infinitesimal duration. Each pulse identifies a time boundary for a time slot 108. The minimum pulse interval is determined by the size of the LS code. In the present embodiment, the LS code consumes 136 chips, and therefore the minimum pulse interval is 136 chips. Alternate embodiments may implement LS codes with different lengths and hence different minimum pulse intervals.

As the LA code defines the timing boundaries over the entire sub-frame 106, the total LA code length refers to the length of the sub-frame 106, including all time slots 108. In the present embodiment, the total LA code length is 2559 chips. Note that the LA code is a parsing scheme that covers the entire sub-frame 106; and therefore, the total LA code length is defined as the length of the sub-frame 106, and not the length of the LA code that lists the time intervals assigned to each time slot 108 within the sub-frame 106. With respect to FIG. 2, while one LS code is applied to each sub-frame 106, one LA code is applied to the entire time slot 108.

As illustrated in FIG. 2, each sub-frame 106 is 2559 chips, wherein a chip is defined as the sample after spreading. The total LA code length, K, is given as the length of one sub-frame 106. Each sub-frame 106 is segmented into a predetermined number of segments, each segment allocated sufficient chips to accommodate one LS code. The number of pulses, N, corresponds to the number of segments after segmentation. For example, as illustrated in FIG. 2, each sub-frame 106 is segmented into 17 segments, i.e., N=17. The minimum pulse interval, $K_0$, is measured in chips and is constrained to a length of at least equal to one LS code, i.e., 136 chips. While $K_0$ defines the minimum segment length of a time slot 108, not all time slots 108 are equal to the minimum segment length, and perhaps no time slot 108 is equal to the minimum segment length. Each time slot 108 is assigned a segment length. When the segment length of the time slot 108 is greater than 136 chips, the difference is made up by gap 110 subsequent to the S component of the modulated LS code.

Figure 3:
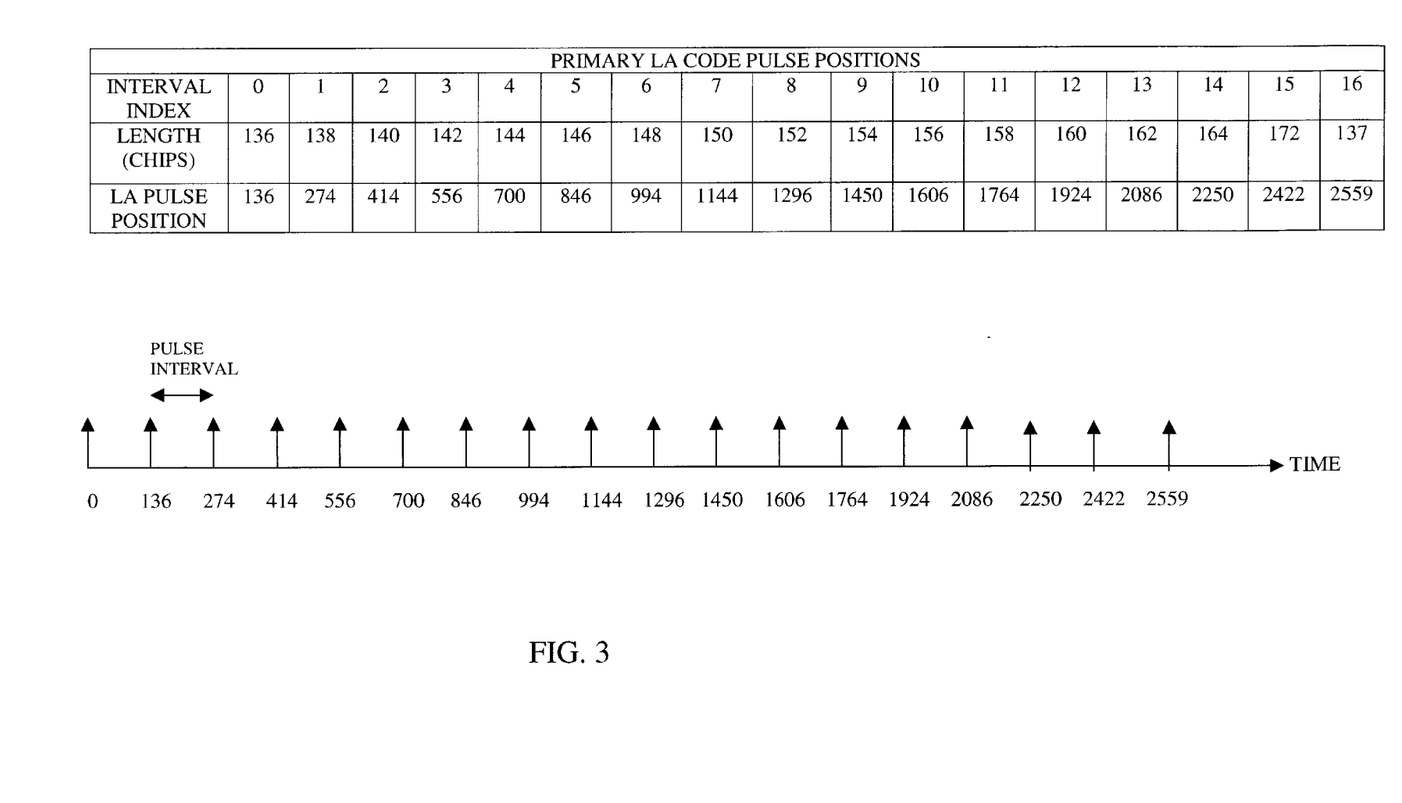
FIG. 3 illustrates in tabular form and timing diagram form pulse code position assignments for LA codes in a Large Area Synchronized (LAS) code system according to one embodiment.

In the present embodiment, LA codes are given having parameters (17,136,2559), i.e., N=17; $K_0$=136; and K=2559. An exemplary LA code is illustrated in FIG. 3. Seventeen pulse intervals are assigned index values from 0 through 16, each corresponding to one of the 17 time slots 108 of FIG. 2. Each pulse interval has an associated chip length and pulse position in time with respect to the other pulses. The pulse positions in time for each index value are illustrated below the LA code. The corresponding pulse positions for the LA code illustrate the chip beginning of each time slot 108. Within the LA code, from the left, the first pulse interval corresponds to a first time slot 108 of FIG. 2 (labeled "0"). The first pulse interval is equal to 136 chips, or the minimum pulse interval. Therefore, the first time slot 108 has a gap 110 equal to zero. Continuing with the LA code, the next pulse interval is associated with the second time slot 108, labeled "1." This interval is 138 chips, and therefore the corresponding pulse occurs at (136+138)=274. The second time slot 108 has a gap 110 equal to two chips. Successive pulse intervals within the LA code define the timing boundaries of the time slots 108 within sub-frame 106, wherein the final pulse occurs at the time corresponding to the $2559^{th}$ chip. Within the LA code of the illustrated embodiment, successive pulse intervals are two chips greater than previous pulse intervals, until the end of the LA code. Alternate embodiments may implement an alternate assignment of pulse intervals. The combination and order of pulse intervals creates a pattern. The pattern is then permuted to create multiple patterns, providing distinct LA codes applicable to multiple cells and/or sectors.

Figure 4:
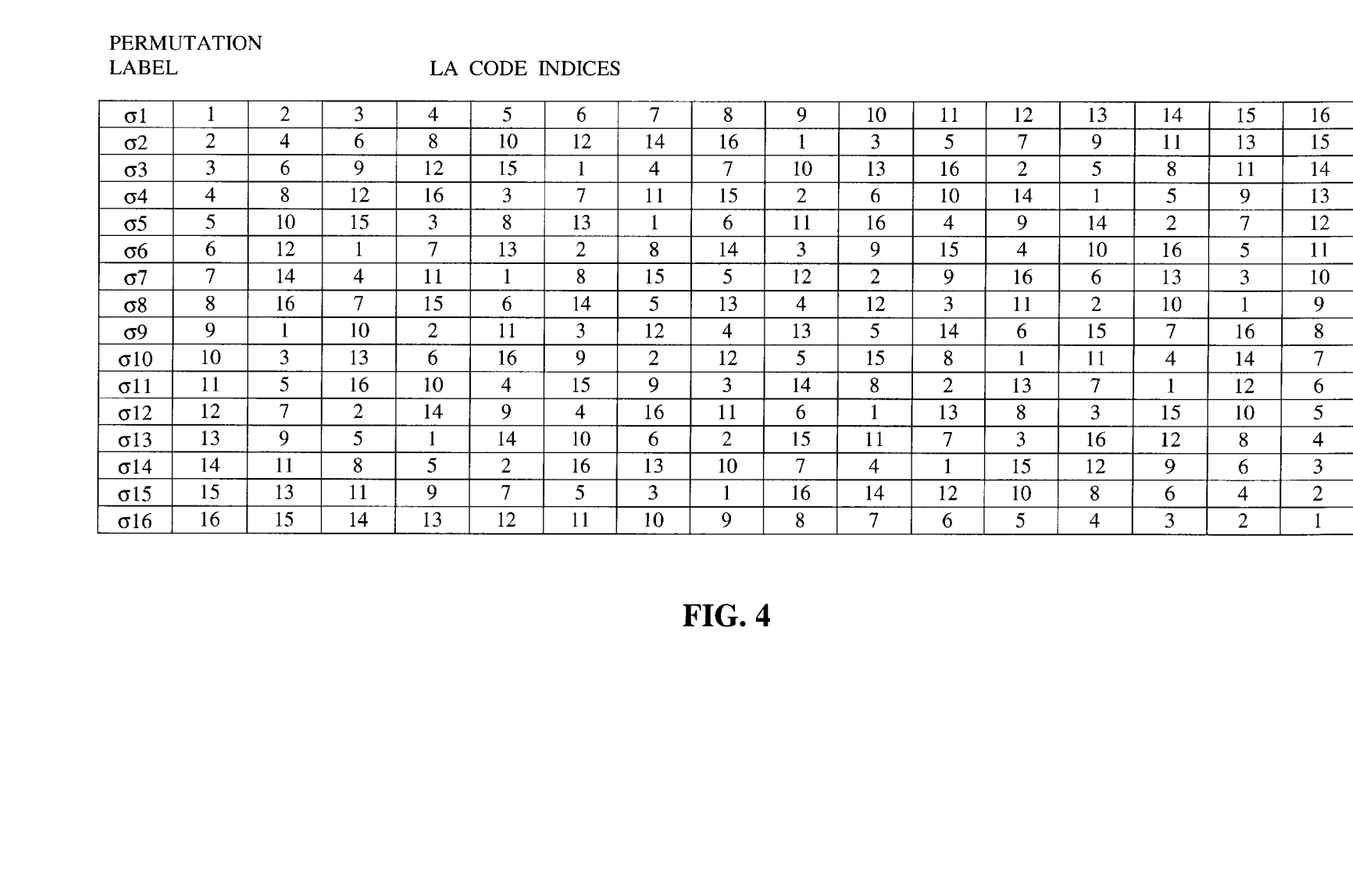
FIG. 4 illustrates various Interference Free Windows (IFWs) in a LAS code system according to one embodiment.

FIG. 4 illustrates an exemplary permutation table for 16 permutations of the primary LA codes of FIG. 3. Each permutation defines a combination of interval index assignments of the primary code, wherein each permutation alters the arrangement and/or order of intervals. The LA code permutations identify cell and/or sector of the base station. LA codes are used in LAS-CDMA to create separate multiple access transmission channels on a same RF carrier. The channels may be used by different cells and/or sectors.

LS Codes

While LA codes are used to identify cell and/or sector, LS codes are used in LAS-CDMA to spread the transmitted signal and create multiple code divided transmission channels. As illustrated in FIG. 2, an LS code is a complementary orthogonal code pair used to spread symbols. Each occurrence of an LS code consists of a pair of codes of equal length: a C component and a S component. The C and S components are separated by gaps. For each LS code, constituent C and S components are designed such that the cross-correlation function of the LS codes is zero within a certain duration.

In one embodiment, the C and S components are generated from initial seeds. Example seed pairs may be given as follows:

(C1; S1)=(++; +−)

(C2; S2)=(−+; −−), wherein a "−" indicates a low logic level bit and a "+" indicates a high logic level bit. In one embodiment, a seed set contains two such seed pairs. The following rule is used to generate double length codes from a seed pair:

(C1  C2;  S1  S2)

(C1  −C2;  S1  −S2)

(C2  C1;  S2  S1)

(C2  −C1;  S2  −S1), wherein a negative indicates the binary complement of the original. The rule may be used to generate continuously longer codes.

The present embodiment generates subsets of LS codes within each set of LS codes having a given LS code length.

The subsets are designed such that the cross-correlation function between any two LS codes in the subset is zero. The range of offsets within which the zero valued cross-correlation is maintained is referred to as the Interference Free Window (IFW). The range or interval of the IFW is represented as [−d, +d], wherein "d" represents the offset distance from the origin, and wherein the origin is the position where the two LS codes are exactly aligned. The range is described over the offset origin, wherein the offset origin refers to no offset between the codes. The cross-correlation properties of the LS codes allow for Multiple Access Interference (MAI) rejection and/or reduction.

Another characteristic of the LS codes is that the auto-correlation is null within an interval centered around the offset origin, but not at the origin. The auto-correlation functions are generally defined for a sequence x, as:

$$R_x(i) = \sum_{j=0}^{J-1} x_j x_{j-i},$$

wherein J is the number of elements in each occurrence of the sequence or code, x is a code element, and j is the code element index. For each successive shift i, the auto-correlation function calculates the summation of the product of $x_j$ and its shifted version $x_{j-i}$. The auto-correlation property of the LS codes allows rejection and/or reduction of the multipath-induced Inter-Symbol Interference (ISI).

The number of LS codes of a given LS code length that satisfy the cross-correlation and auto-correlation properties corresponds to a given IFW size. In other words, the number of LS codes per subset may be determined by the IFW size and the LS code length. For a fixed LS code length, the width of the IFW increases, the number of LS codes satisfying these properties decreases.

Figure 5:
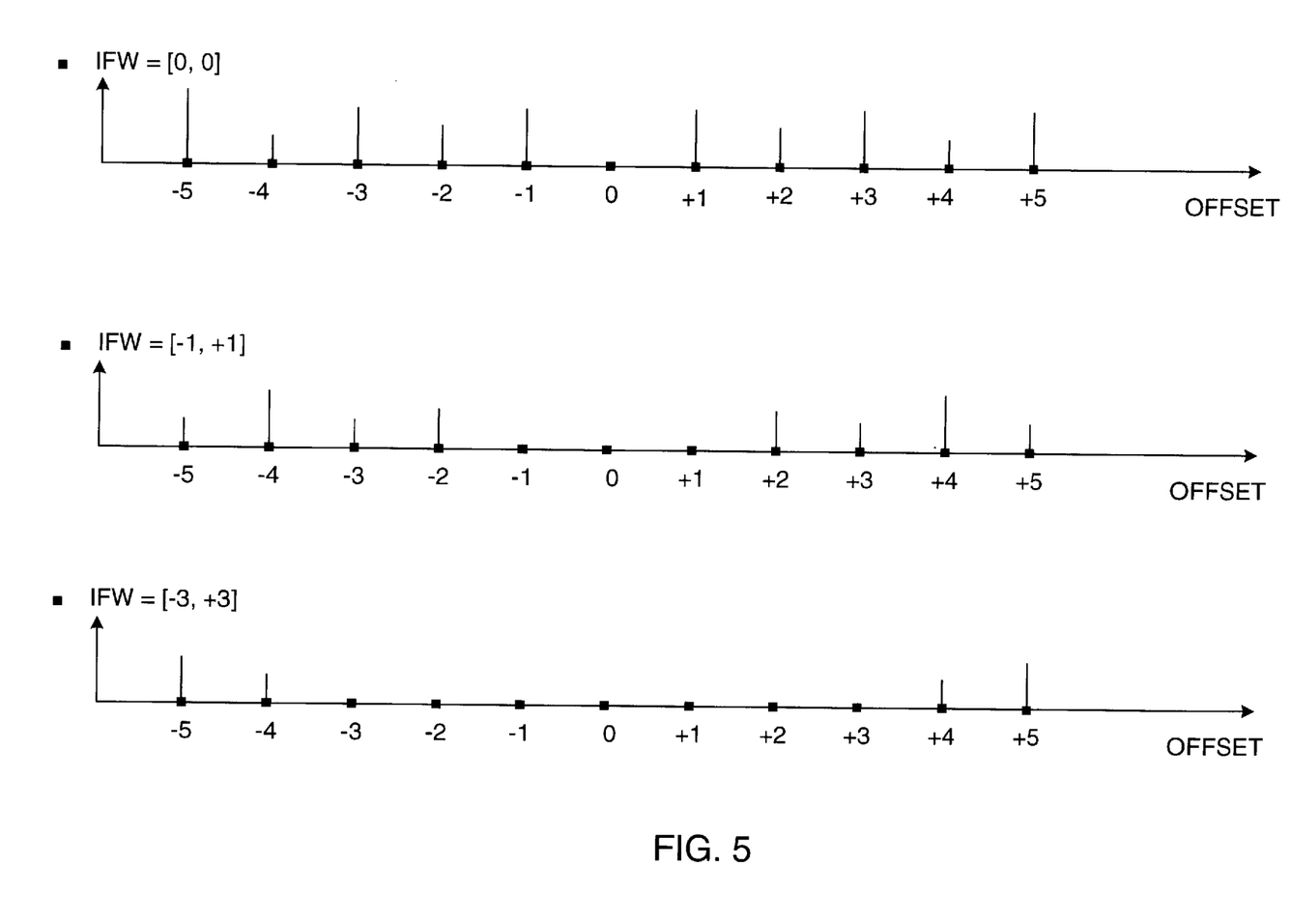
FIG. 5 illustrates a permutation table of LA codes in a LAS code system according to one embodiment.

FIG. 5 illustrates several IFWs with respect to offset intervals. The IFW defines the offset between the two codes, wherein the cross-correlation between the two codes is null. The distance from the origin corresponds to the shift from the origin, wherein the codes are shifted in time with respect to each other. As illustrated, for IFW=[0,0], the window covers the origin. As the window increases, the number of LS codes available decreases.

Figure 6:
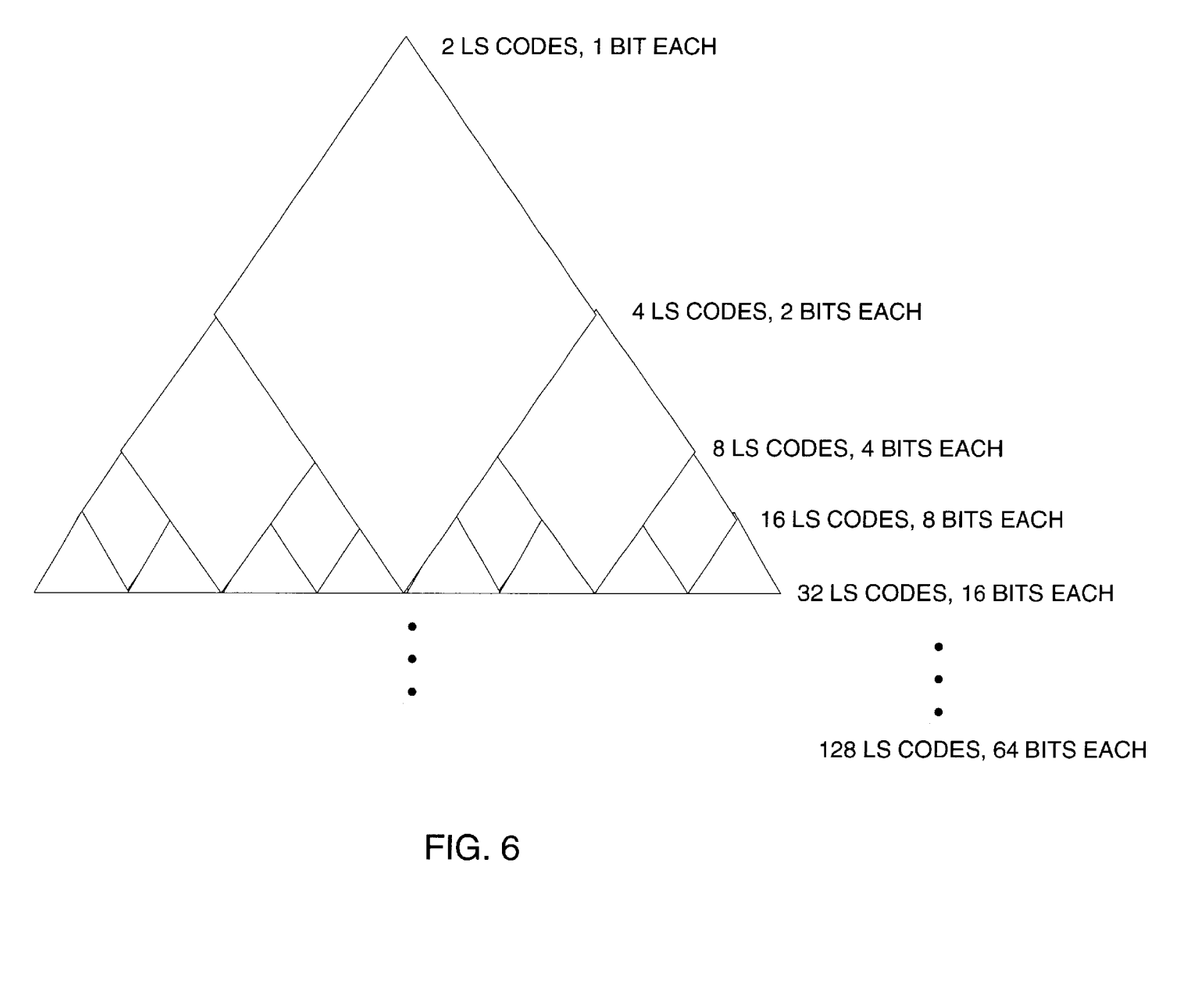
FIG. 6 illustrates an arborescence structure for determining a calculation of LS code length as a function of Interference Free Window (IFW) size.

In one embodiment, LS codes are defined according to an arborescent structure, such as illustrated in FIG. 6. The structure begins with a code length of two bits, wherein each of the C and S components are one bit. Progressing down the structure, four LS codes are provided with two bit components, followed by eight LS codes of four bit components, and finally through to 128 LS codes of 64 bit components. For a 128 bit LS code, the desired IFW determines the number of codes available to form a LS code subsets. For example, an IFW=[−7, +7] the subset includes 16 codes. As the size of the window decreases, the number of codes available for the subset increases. For IFW=[−3, +3] the subset includes 32 codes; for IFW=[−1, +1] the subset includes 64 codes; and for IFW=[0,0] the subset includes all 128 codes. Note that IFW=[0,0] indicates that there is effectively no IFW. The following table provides an example for LS code length of 128 bits.

Table 1. IFW Versus LS Code Subset Size

| IFW | Number of LS Codes |
| --- | --- |
| [0,0] | 128 |
| [−1,+1] | 64 |
| [−3,+3] | 32 |
| [−4,+4] | 16 |

Signal Transmission

Figure 7:
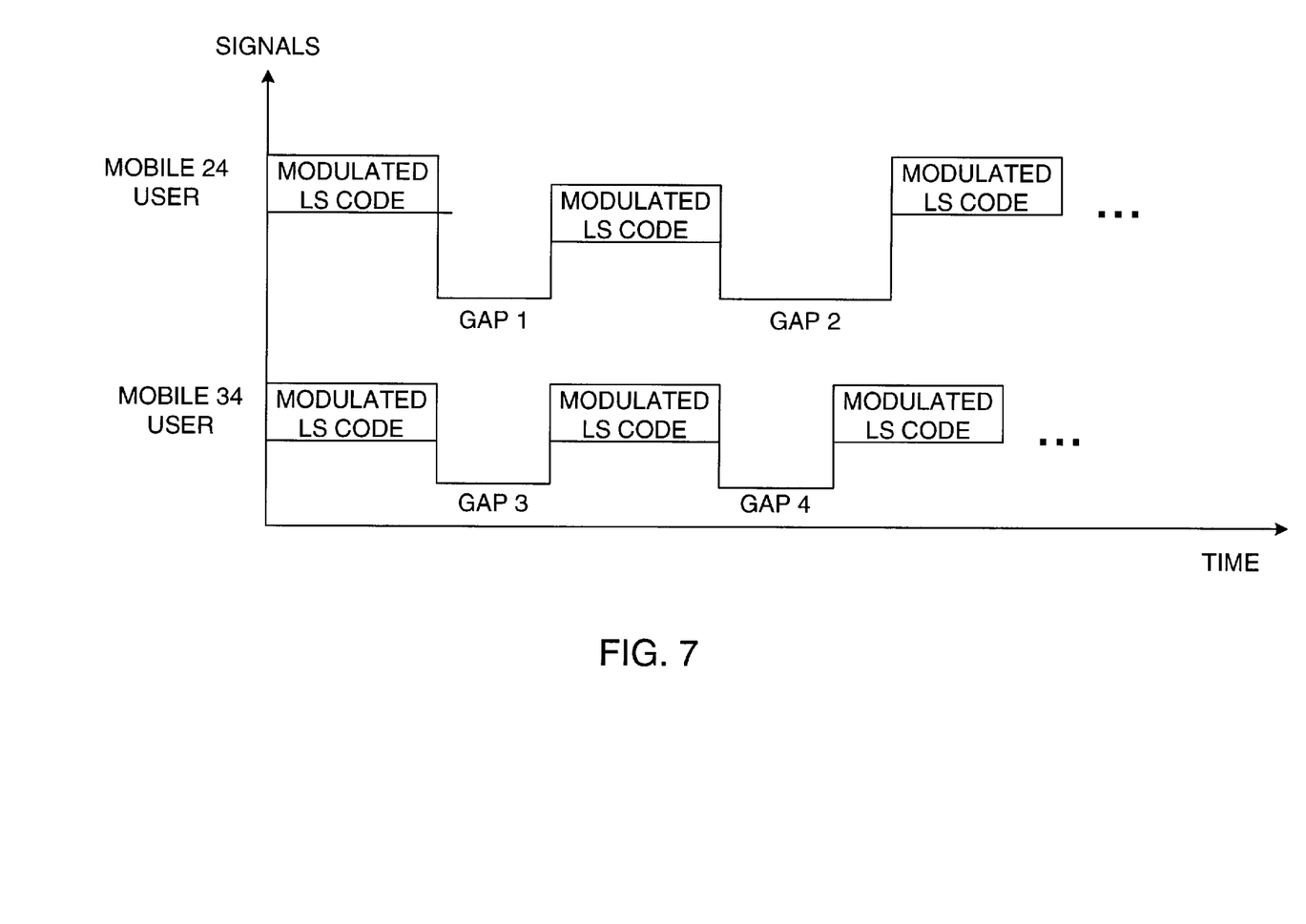
FIG. 7 illustrates transmission protocols for mobile units in a LAS code system according to one embodiment.

FIG. 7 illustrates transmissions within each of two cells within system 10 of FIG. 1. The transmission signals include symbols 108, as illustrated in FIG. 2, separated by gaps in time of varying duration. In the example illustrated, signals are transmitted to mobile user 24 within a first cell that is assigned a first LA code. The first LA code defines a time boundary sequence. The first LA code defines the chip sizes of gap 1, gap 2, etc. For mobile user 34 within a second cell of the first cell's neighborhood, signals are transmitted having a second LA code defining chip sizes of gap 3, gap 4, etc. The LA sequence for each mobile user 24, 34 continues with other gap durations between modulated LS codes. The particular LA sequence identifies the base station from which the transmissions are sent. The gap between symbols is a time duration during which no information is sent. The sequence of gaps, or the LA sequence, is effectively a code assigned to a base station or other transmitting source. The total frame length for each of mobile user 24 and mobile user 34 is consistent; only the time duration and order of the gaps between modulated LS codes is different among users. Each frame complies with a predetermined format and/or protocol that defines the time allowed for an entire frame. The LA code effectively sets the symbol boundaries within a frame. Note that for transmissions from a given base station, the sub-frame pattern, i.e., LA code, repeats in successive frames. Alternate embodiments may alter the frame length per user. Note that within a cell and/or sector, a base station uses a single LA sequence. Neighboring cells will be assigned different LA sequences.

Within a cell and/or sector each mobile user is assigned a unique LS code. However, neighboring cells/sectors may reuse the LS codes, and most likely will have at least one LS code in common. The common use and reuse of LS codes by neighboring cells and/or sectors creates interference that may impede correct reception of transmitted signals by one or multiple mobile users in neighboring cells/sectors. The exemplary embodiment utilizes the IFW characteristics of a LAS-CDMA system by forming subsets of codes based on a desired IFW.

Assignment of LS Codes

Figure 8A:
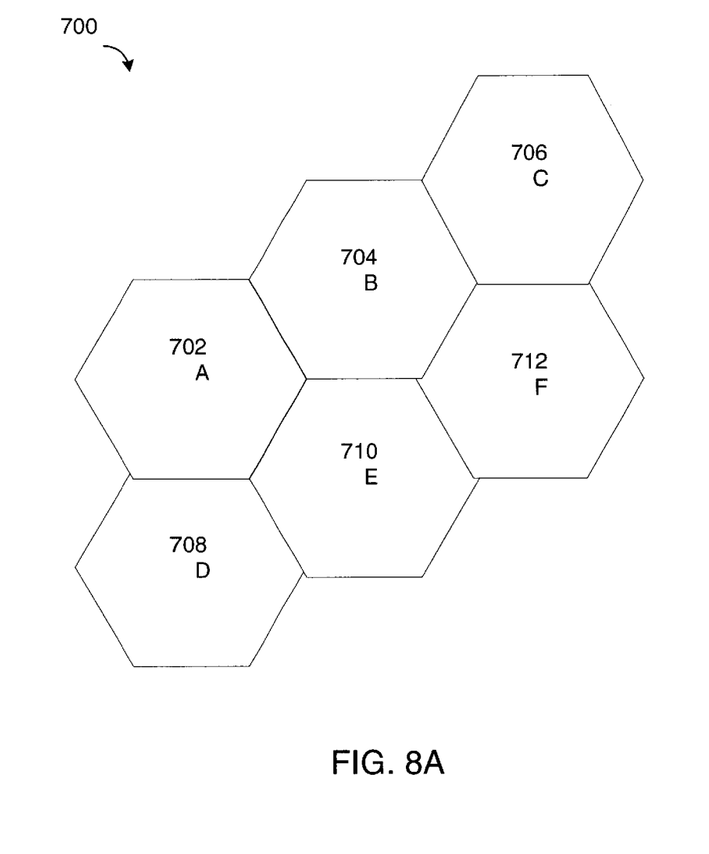
FIGS. 8A and 8B illustrate in block diagram form various code assignment schedules for a LAS code system according to alternate embodiments.

FIG. 8A illustrates assignment of LS code subsets to neighboring cells within a system 700 having cells 702, 704, 706, 708, 710, 712. As illustrated, a unique LS code subset is assigned to each neighboring cell. For example, a subset A is assigned to cell 702. The neighbors to cell 702 are each assigned a different and unique subset of LS codes, wherein subset B is assigned to cell 704, subset C is assigned to cell 706, subset D is assigned to cell 708, subset E is assigned to cell 710, and subset F is assigned to cell 712. In this way, no mobile user in cell 702 will be assigned a code used in a neighboring cell. There is no reuse within the neighboring cells of cell 702.

Figure 8B:
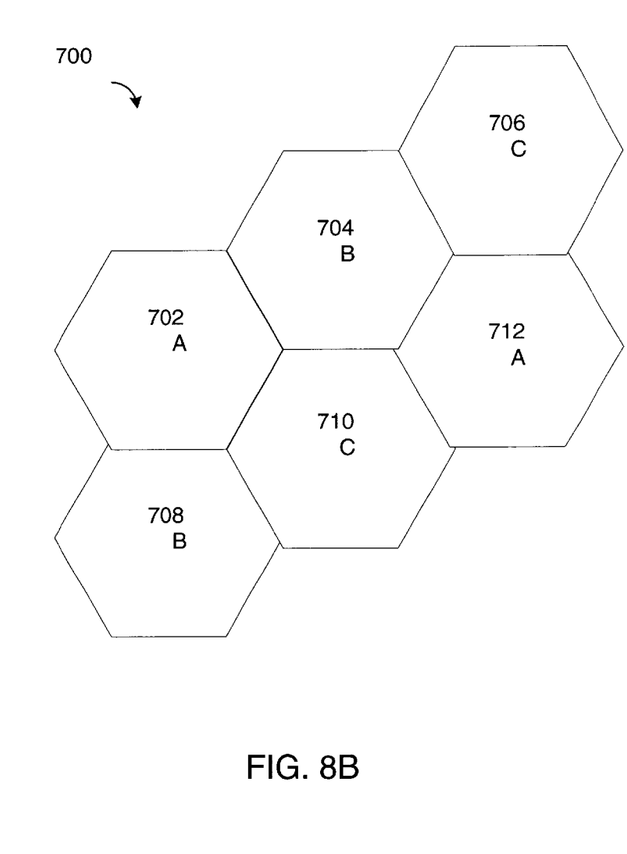

Note that not all neighbor cells of cell 702 may be assigned different subsets. One assignment schedule is illustrated in FIG. 8B, wherein no two neighbor cells have a common LS code set assignment. The illustrated schedule assigns three LS code subsets to the cells within system 700. The subset A is assigned to cell 702. The subset B is assigned to cells 704 and 708, as these two cells are not neighbors. Subset C is assigned to cells 706 and 710. Note that subset A is then assigned to cell 712, as this cell is not a neighbor of cell 702. As in the schedule illustrated in FIG. 8A, no neighboring cells are assigned a common code set.

In accordance with one embodiment, a process of assigning LS code subsets determines the size of the IFW. This is the acceptable level of interference allowed in the system. For example, an IFW =[0,0] indicates that no offsets maintain the desired cross-correlation property. In other words, there is no window of offsets that is interference free. Similarly, an IFW =[−1,+1] indicates that a group of LS codes can be found that maintains these properties for offsets of +1 to (−1). The size of the LS subset is calculated as a function of the IFW selected. Specific code subsets are formed, wherein the number of codes available for a subset is determined from the selected IFW and the length of the LS codes. The LS codes ay be assigned to subsets sequentially or in some other fashion, wherein in one embodiment, at least three subsets are formed providing complete isolation of cells with honeycomb layout, as illustrated in FIGS. 8A and 8B. Alternate embodiments may incorporate alternate numbers of subsets and allow different isolation. Still other embodiments may incorporate additional subsets to provide additional isolation of cell . Each system may be implemented to accommodate the vagaries of the transmission environment. For example, one system may require less isolation due to a sparse concentration of expected mobile users or due to a specific type of terrain, while other systems may require additional isolation beyond neighboring cells due to a dense concentration of users. As an example, consider the case illustrated in FIG. 6, for a total of 128 LS codes, wherein a desired IFW =[−1,+1] corresponds to 64 LS codes per subset. The available codes may then be assigned to subsets.

In one embodiment the system 10 selects the IFW based on the multi-path propagation delay profile of a mobile user. Note that the MAI and ISI within the IFW may be reduced. It is more difficult to remove or reject the MAI and ISI outside of the window. As the size of the IFW increases, the number of LS codes that maintain the IFW decreases. However, the number of LS code subsets increases. For example, as discussed hereinabove, with an LS code length of 128 bits, an IFW=[−1,+1] results in subset size of 64 LS codes. As there are a total of 128 codes, this allows two subsets of 64 LS codes. For an IFW=[−3,+3], the resultant LS code subset size is 32, and there are, therefore, four subsets that may be formed from the 128 LS codes.

A LS code subset is then assigned to one cell. A check is made to see if the same code subset is used in a neighboring cell. This is to ensure that neighboring cells are using distinct subsets. If no neighboring cell is using the same subset, processing continues to determine if all cells have been assigned. If a neighboring cell uses the same LS code subset, processing continues to select a different LS code subset. The different LS code subset may be the next sequential subset of codes or may be a disjoint set of codes. The processing continues until all cells in the system have been assigned code subsets.

The process will typically be performed by a base station controller (not shown) that provides control for multiple base stations within a wireless telecommunication system. The processing may alternately be performed by each base station, wherein each base station within a system, such as stations 22, 32, 42, 52, 62, 72, communicates with each other base station in the selection of LS code subsets. In such an embodiment, once a base station has selected a LS code ubset, this selection is communicated to other base stations within the system. Negotiation between base stations may be used to allow each base station to isolate communications within the corresponding cell from neighboring cells, i.e., the neighborhood, while allowing each neighbor to perform the same with respect its neighborhood. The assignment of LS code subsets is a dynamic process and may be modified or changed due to changing circumstances within a given system. When for example, the desired IFW changes, it may be necessary to change the LS code assignments. In this case, fewer codes may be available to form subsets. In another instance, the concentration of mobile users may change, requiring a smaller IFW and making more codes available.

According to one embodiment, a wireless LAS-CDMA communication system implements multiple LS code subsets, wherein each LS code subset is assigned to a cell and/or sector within the system and different subsets are assigned to neighboring cells. The subsets are formed to achieve a desired IFW, wherein the IFW determines the number of codes in each subset. Application of such subsets to neighboring cells reduces the interference between neighboring cells. In one embodiment, the size of the subsets is determined by the length of the codes and the IFW according to an arborescence structure. In this way, the interference experienced by neighboring cells in a wireless communication system is reduced.

Thus, a novel and improved method and apparatus identifying mobile users in a wireless transmission in a wireless communication system has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a digital signal processor (DSP); an application specific integrated circuit (ASIC); a field programmable gate array (FPGA) or other programmable logic device; discrete gate or transistor logic; discrete hardware components such as, e.g., registers and FIFO; a processor executing a set of firmware instructions; any conventional programmable software module and a processor; or any combination thereof designed to perform the functions described herein. The processor may advantageously be a microprocessor, but in the alternative, the processor may be any conventional processor, controller, microcontroller, or state machine. The software modules could reside in RAM memory, flash memory, ROM memory, EPROM memory, EEPROM memory, registers, hard disk, a removable disk, a CD-ROM, or any other form of storage medium known in the art. The processor may reside in an ASIC (not shown). The ASIC may reside in a telephone (not shown). In the alternative, the processor may reside in a telephone. The processor may be implemented as a combination of a DSP and a microprocessor, or as two microprocessors in conjunction with a DSP core, etc.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a wireless communication system adapted for Large Area Synchronized-Code Division Multiple Access (LAS-CDMA) transmissions, the transmissions using LS codes for spread-spectrum modulation, a method comprising:
   determining a size of an interference free window (IFW);
   calculating a plurality of subsets of LS codes, each subset comprising a number of LS codes as a function of the IFW;
   assigning a first of the plurality of subsets to a first portion of the system; and
   assigning a second of the plurality of subsets to a second portion of the system.

2. The method of claim 1, wherein the calculating further comprises:
   determining a number of subsets for application within the system;
   determining the first subset of LS codes having null cross-correlation with respect to each other; and
   determining the second subset of LS codes having null cross-correlation with respect to each other.

3. The method of claim 1, further comprising:
   identifying mobile stations within the first portion of the system with LS codes from the first of the plurality of subsets; and
   identifying mobile stations within the second portion of the system with LS codes from the second of the plurality of subsets.

4. The method of claim 1, wherein a cross-correlation of the LS codes within the first and second of the plurality of subsets is null within the IFW.

5. The method of claim 1, wherein the size of the IFW corresponds to an LS code length, and wherein calculating the plurality of subsets further comprises:
   generating seed pairs given as:

$(C1; S1)$;

and $(C2; S2)$;

generating a plurality of LS codes of the LS code length by application of a formula given as:

$(C1 \quad C2; \quad S1 \quad S2)$ $(C1 \quad -C2; \quad S1 \quad -S2)$ $(C2 \quad C1; \quad S2 \quad S1)$ $(C2 \quad -C1; \quad S2 \quad -S1)$, wherein a negative indicates a binary complement of an original element.

6. The method as in claim 5, further wherein the number of subsets is at least three.

7. A wireless communication system incorporating a LAS-CDMA protocol, comprising:
   a first cell, the first cell being assigned a first subset of LS codes; and
   a second cell, the second cell being assigned a second subset of LS codes,
      wherein the first and second subsets have a null cross-correlation within a predetermined interference free window.

8. The system as in claim 7, wherein the first and second cells are neighboring cells.

9. The system of claim 8, further comprising:
   a first neighborhood of cells each neighboring the first cell, wherein the
   second cell is in the first neighborhood.

10. The system of claim 9, further comprising:
    a third cell within the first neighborhood, the third cell being assigned a third subset of LS codes, wherein the LS codes within the first and third subsets have a null cross-correlation within the predetermined interference free window.

11. In a Large Area Synchronized-Code Division Multiple Access wireless communication system, a method comprising:
    transmitting a first communication within a first cell, the first communication identifying at least one mobile station within the first cell by a first LS code within a first subset of LS codes; and
    transmitting a second communication within a second cell, the second communication identifying at least one mobile station within the second cell by a second LS code within a second subset of LS codes;
    wherein a cross-correlation between any two LS codes within the first is null within an interference free window, and the cross-correlation between any two LS codes within the second subset is null within the interference free window.

12. The method of claim 11, wherein the first and second subsets of LS codes are part of a set of LS codes defined by the interference free window.

13. The method of claim 12, wherein for the set of LS codes comprises 128 codes, the interference free window equal to [−1,+1] corresponds to 64 available codes for forming subsets.

14. The method of claim 12, wherein a correspondence between the interference free window and a number of available codes for forming subsets is based on an arborescence structure.

15. A controller in a Large Area Synchronized-Code Division Multiple Access wireless communication system, comprising:
    a first set of instructions for determining an interference free window size for communications between neighboring cells; and a second set of instructions for determining at least two sets of LS codes based on the interference free window size, a first set for identifying mobile stations in a first cell and a second set for identifying mobile stations in a neighboring cell;

wherein the LS codes within the two sets of LS codes have a null cross-correlation within an interference free window.

16. The controller of claim 15, further comprising:

a third set of instructions for assigning the first set of LS codes to communications in the first cell; and a fourth set of instructions for assigning the second set of LS codes to communications in the second cell.

17. In a Large Area Synchronized-Code Division Multiple Access wireless communication system, the system having a first cell and a first cell neighborhood, a computer data signal embodied on a carrier wave, the signal comprising:

a first portion comprising header information for transmission to a first mobile user in a first cell; and a second portion comprising a first LS code corresponding to the first mobile user, the first LS code being part of a first set of LS codes, and wherein within the first cell neighborhood, the first LS code is assigned only to the first cell.

18. The signal of claim 17, further comprising:

a third portion comprising the first LS code.

19. The signal of claim 18, wherein:

the second portion has an associated first data symbol and the third portion has an associated second data symbol, the second portion further comprises the first LS code modulated by the first data symbol; and the third portion further comprises the first LS code modulated by the second data symbol.

20. The signal of claim 8, wherein a second set of LS codes is assigned to a second cell within the first cell neighborhood.

21. In a wireless communication system incorporating a LAS-CDMA protocol, a first cell, comprising:

a first set of computer readable instructions adapted to receive a first LS code set, the first LS code set having a plurality of LS codes of a predetermined first length, wherein each of the plurality of LS codes in the first LS code set has a null cross-correlation with respect to each other LS code in the first LS code set; and a second set of computer readable instructions adapted to generate a data signal on a carrier wave, the data signal comprising:

a first portion comprising header information for transmission to a first mobile within the first cell; and a second portion comprising a first LS code corresponding to the first mobile user, the first LS code being part of the first LS code set.

22. A wireless apparatus adapted for operation with the first cell of claim 21.

* * * * *